United States Patent Office 3,567,637
Patented Mar. 2, 1971

3,567,637
METHOD OF PREPARING OVER-BASED ALKALINE EARTH LONG-CHAIN ALKENYL SUCCINATES
Albert R. Sabol, Munster, Ind., assignor to Standard Oil Company, Chicago, Ill.
No Drawing. Filed Apr. 2, 1969, Ser. No. 812,842
Int. Cl. C10m 1/10
U.S. Cl. 252—39         6 Claims

ABSTRACT OF THE DISCLOSURE

Over-based alkaline earth salts of long chain alkenyl-substituted succinic anhydride or acid (hereinafter referred to as alkaline earth long chain alkenyl succinates) are prepared by reacting a long chain alkenyl-substituted succinic anhydride or acid, having at least 30 carbon atoms in the alkenyl substituent, or the alkaline earth salt thereof, with more than stoichiometric amounts of an inorganic basic alkaline earth compound in the presence of a lower alkanol, sufficient amounts of gaseous carbon dioxide to convert the excess basic alkaline earth compound to carbonate, and catalytic amounts of ammonia.

BACKGROUND OF THE INVENTION

The prior art, exemplified by U.S. Pat. 3,271,310, issued Sept. 6, 1966, discloses the use of metal salts of alkenyl succinic acid as additives for lubricating oils to impart detergency and/or anti-rust properties thereto.

Heavy-duty detergent-type lubricating oil compositions for use in spark-ignition internal combustion engines and in diesel engines should possess at least two characteristics in addition to lubricity, oxidation and thermal stability, rust and/or corrosion inhibiting properties, etc. First, the oil should possess the power to disperse insolubles formed by fuel combustion and/or oil oxidation. Second, the oil composition should be capable of neutralizing acidic materials formed by the oxidation of the oil. These two characteristics can be imparted to the lubricating oil composition by incorporating therein over-based or highly alkaline detergent-type additives.

Increasing the alkalinity of such detergency additives is commonly referred to as "over-basing." The highly desirable effect of over-basing is to obtain the carbonate, or other salt, of the alkaline earth metal in finely dispersed form within the composition. Although such over-basing is employed in general with inorganic alkaline earth compounds, over-basing with basic calcium and with basic magnesium compounds is especially difficult.

SUMMARY OF THE INVENTION

In accordance with the present invention over-based alkaline earth long chain alkenyl-substituted succinates are prepared by reacting at a temperature of from about 75° F. to about 135° F., preferably from about 110° F. to about 120° F., a mixture comprising a long chain alkenyl-substituted succinic anhydride or acid, or the alkaline earth salt thereof, an excess amount of an inorganic basic alkaline earth compound, preferably from about 1.5 to about 10 mols of said base per mol of said succinic compound, and from about 5 to about 15 mols of a lower alkanol per mol of said succinic compound, while introducing into said mixture from about 0.05 to about 0.5 mols of gaseous ammonia per mol of said base, and gaseous carbon dioxide at a rate of from about 0.2 to about 3 cubic feet per hour per mol of said base for a time sufficient to convert unreacted basic alkaline earth compound to the corresponding carbonate. Thereafter, after removal of the alkanol, depending upon the alkaline earth compound used, 0 to about 10 mols of water per mol of basic compound charged, are added, the temperature raised to about 220 to 400° F., and the product filtered.

The long chain alkenyl-substituted succinic anhydride or acid reactant is readily obtained by reacting maleic anhydride or acid with a long chain alkenyl hydrocarbon having at least 30 carbon atoms in the alkenyl substituent. Preferred long chain or high molecular weight alkenyl substituents are polymers of at least 30 carbon atoms of monoolefins having from 2 to about 12, preferably 2 to about 4 carbon atoms. Chlorinated derivatives of such polymers can also be reacted with the maleic anhydride or acid. Also, the maleic anhydride or acid can be reacted with naturally occurring or synthesized long chain substantially aliphatic hydrocarbons of at least 30 carbon atoms. For example, a suitable polymer for reacting with the maleic anhydride or acid is the product obtained by the well-known process of polymerizing in the liquid phase a petroleum refinery hydrocarbon gas mixture containing butylenes and isobutylenes together with butanes and some $C_3$ to $C_5$ hydrocarbons in the presence of a Friedel-Crafts catalyst such as aluminum chloride, boron trifluoride, etc. As noted hereinbefore, the alkenyl hydrocarbon substituent should contain at least 30 carbon atoms, and preferably from about 50 to about 200 or more carbon atoms, and molecular weights in the range of from about 400 to about 100,000, suitably from about 400 to 2,000.

The suitable inorganic basic alkaline earth compounds are well-known in the art, and include the oxides and hydroxides of barium, strontium, calcium, and magnesium. Since the over-based calcium and magnesium long chain alkenyl-substituted succinates are the more difficult to prepare, the present invention is particularly directed to the preparation of such succinates, but includes the preparation of the other over-based alkaline earth succinates.

The lower alkanol employed is preferably an alkanol of from 1 to about 4 carbon atoms, e.g., methanol, ethanol, butanol and propanol; methanol being the preferred alkanol.

The process steps of the present invention comprises diluting the long chain alkenyl-substituted succinic anhydride or acid with a solvent and/or diluent, such as a low viscosity lubricating oil and/or an aromatic or aliphatic hydrocarbon solvent, e.g., mixed xylenes or hexane, adding to the diluted mixture the required amount of the inorganic alkaline earth compound and the alkanol. This mixture is then blown with the gaseous ammonia and the gaseous carbon dioxide for a period of from about 5 to about 30 minutes. The introduction of ammonia into the mixture is then discontinued; and the blowing with carbon dioxide continued for a period of from about ½ to about 5 hours until substantially all of the unreacted basic compound is converted to the carbonate. During the introduction of the ammonia and carbon dioxide the temperature of the mixture is maintained below about 160–180° F., the preferred temperature range being from about 60° F. to about 110° F. The temperature of the reaction mixture during the continued addition of the carbon dioxide is between about 75° F. and about 120° F. After the introduction of carbon dioxide is discontinued the temperature of the reaction mixture is maintained between about 75° F. and about 120° F.; thereafter, the reaction temperature is raised to remove the alkanol, and if desired, a portion of the hydrocarbon solvent. After removal of the alkanol, the temperature of the mixture is maintained at about 190–210° F., and, when required, from about 0.5 to about 10 mols of water per mol of the basic compound charged, is slowly added to the reaction product; it is pointed out that in the preparation of the over-based barium succinates it is not necessary to add water at this stage. The reaction product mixture is thereafter heated to a temperature of from about 220° F. to about 400° F., and filtered through a suitable filtering media, e.g., diatomaceous earth, to remove oil-insoluble materials. If the filtration temperature is not sufficiently high to remove the hydrocarbon diluent, the filtrate is heated to a temperature high enough to remove such diluent.

Although in the foregoing process description the said succinic anyhdride or acid is employed, the process can be conducted by first preforming the neutral alkaline earth succinate, and then treating the neutral salt with excess inorganic basic alkaline earth compound as above described.

DESCRIPTION OF A PREFERRED EMBODIMENT

The following examples are illustrative of the preferred embodiment of the present invention.

PREPARATION I

Part 1

400 grams (0.4 mols) of a polybutene-substituted succinic anhydride, in which the polybutene substituent had a molecular weight of about 400, was diluted with 250 grams of a S.A.E. 5W mineral oil.

Part 2

To the oil-diluted mixture of Part 1 were added 600 ccs. of xylene, 170 grams (3 mols) CaO, and 400 ccs. of methanol; i.e., 7 mols of CaO per mol of the succinic compound.

Part 3

The mixture of Part 2 was blown at room temperature with gaseous ammonia at a rate of 1.6 cu. ft./hr. and with gaseous carbon dioxide at the same rate for a period of 5 minutes. The addition of the ammonia was then stopped, and carbon dioxide blowing continued for 105 minutes.

Part 4

The product of Part 3 was heated to 200° F. to remove the methanol and some xylene.

Part 5

To the methanol-free product of Part 4 were added 50 ccs. of water and the mixture maintained at the temperature of 180–200° F. for a period of 30 minutes, and the temperature then raised to 240° F., and the resultant product then filtered.

Part 6

The filtrate recovered in Part 5 was heated to 340° F. to remove the remaining xylene.

The recovered product had a Total Base Number (TBN) of 320 and contained 11.3% calcium.

PREPARATION II

Preparation II was similar to Preparation I, except that 7 mols of MgO per mol of the polybutene-substituted succinic anhydride was used. The recovered over-based magnesium polybutene-substituted succinate had a TBN of 260, and a magnesium content of 5.56%.

As demonstrated by the following examples, carrying out preparations similar to Preparations I and II above, but without the ammonia promoter, failed to produce over-based products.

PREPARATION III

Part 1

400 grams (0.4 mols) of a polybutene-substituted succinic anhydride, in which the polybutene substituent had a molecular weight of about 400, was diluted with 250 grams of a S.A.E. 5W mineral oil.

Part 2

To the oil-diluted mixture of Part 1 were added 600 ccs. of xylene, 170 grams (3 mols) CaO, and 400 ccs. of methanol.

Part 3

The mixture of Part 2 was mixed at room temperature for 15 minutes, and then gaseous carbon dioxide, at the rate of 1.6 cu. ft./hr., was introduced into the mixture. After 10 minutes of carbon dioxide addition a slight increase in temperature was noted. After 20 minutes of carbon dioxide addition a decrease in temperature was noted; after 115 minutes of carbon dioxide addition the maximum temperature increase was about 10° F. (In the preparation of Preparation I above, the temperature during the carbon dioxide addition rose from room temperature to 135° F. External cooling was required to maintain the temperature below 137° F., the decomposition temperature of the promoter.)

Part 4

After 105 minutes of carbon dioxide addition the product was heated to 200° F., and 50 ccs. of water were added. A temperature increase was observed which indicated reaction of CaO with $H_2O$ to form $Ca(OH)_2$.

Part 5

The product of Part 4 was then heated to 350° F. to remove water and xylene, and then filtered; filtration was slow. The recovered filtrate had a TBN of 70.

PREPARATION IV

Part 1

400 grams of a polybutene-substituted succinic anhydride, in which the polybutene-substituent had a molecular weight of about 400, was diluted with 250 grams of a S.A.E. 5W mineral oil.

Part 2

To the oil-diluted mixture of Part 1 were added 600 ccs. of xylene, 120 grams (3 mols) MgO, and 400 ccs. of methanol.

Part 3

The mixture of Part 2 was mixed at room temperature for 15 minutes, and then gaseous carbon dioxide, at the rate of 1.6 cu. ft./hr., was introduced into the mixture for 1.5 hours. Little or no temperature increase was noted during the carbon dioxide addition.

Part 4

After the 1.5 hours of carbon dioxide addition, the mixture of Part 3 was heated to 200° F. to remove the methanol and some of the xylene.

Part 5

50 ccs. of water were then added at 200° F. The mixture became very viscous and could no longer be processed. This viscosity increase or gel formation was apparently caused by the conversion of MgO to $Mg(OH)_2$.

The data presented by the foregoing preparations demonstrate that the use of ammonia and blowing with carbon dioxide in the preparation of over-based alkaline earth succinates, of the type herein described, in accordance with the present invention results in improved metal utilization, and increased total base number of such succinates.

The over-based alkaline earth long chain alkenyl-substituted succinates are useful for many purposes. The higher molecular weight succinates are valuable as detergent additives for heavy duty motor oils, and the lower molecular weight succinates are useful as rust inhibitors and as smoke inhibitors in diesel fuels.

Percentages given herein and in the appended claims are weight percentages unless otherwise stated.

While particular embodiments of the invention have been described, it is to be understood that the invention is not limited thereto, but includes such modifications and variations as come within the spirit and scope of the appended claims.

I claim:

1. The process of preparing an over-based long chain alkenyl-substituted succinate, of solvent or diluent reacting a mixture comprising a long chain alkenyl-substituted succinic compound having at least 30 carbon atoms in the alkenyl substituent selected from the group consisting of a succinic anhydride, a succinic acid, and a neutral succinate, and from about 5 to about 10 mols of a lower alkanol per mol of said succinic compound, with from about 1.5 to about 10 mols of an inorganic base of a metal selected from the group consisting of calcium and magnesium per mol of said succinic compound, and introducing into the mixture from about 0.05 to about 0.5 mol of gaseous ammonia per mol of said inorganic base and gaseous carbon dioxide at a rate of from about 0.2 to about 3 cubic feet per hour per mol of said inorganic base for a time sufficient to convert unreacted said inorganic base to the corresponding carbonate while maintaining the reaction temperature below about 160°–180° F., heating the reaction mixture to a temperature sufficient to distil off the alkanol, adding to the alkanol-free reaction mixture 0 to about 10 mols of water per mol of said inorganic base charged at a temperature of about 190°–210° F., heating the water-containing reaction mixture to a temperature of from about 220° F. to about 400° F., and filtering the reaction mass to recover the over-based long chain alkenyl-substituted succinate.

2. The process of claim 1, in which the long chain alkenyl-substituted succinic compound is a succinic anhydride, the lower alkanol is methanol, and the inorganic base is CaO.

3. The process of claim 1, in which the long chain alkenyl-substituted succinic compound is a succinic anhydride, the lower alkanol is methanol, and the inorganic base is MgO.

4. The process of claim 1, wherein the long chain alkenyl-substituted succinic compound is polybutene-substituted succinic anhydride in which the polybutene has a molecular weight of from about 400 to about 2,000.

5. The process of claim 1, in which the process is carried out in the presence of a hydrocarbon solvent.

6. The process of claim 5, wherein the hydrocarbon solvent is xylene.

References Cited

UNITED STATES PATENTS

| | | | |
|---|---|---|---|
| 3,271,310 | 9/1966 | Le Suer | 252—39X |
| 3,272,746 | 9/1966 | Le Suer et al. | 252—34X |

DANIEL E. WYMAN, Primary Examiner

W. CANNON, Assistant Examiner

U.S. Cl. X.R.

252—34.7

PO-1050
(5/69)

UNITED STATES PATENT OFFICE
CERTIFICATE OF CORRECTION

Patent No. 3,567,637   Dated March 2, 1971

Inventor(s) ALBERT R. SABOL

It is certified that error appears in the above-identified patent and that said Letters Patent are hereby corrected as shown below:

Column 5, line 8, cancel "of solvent or diluent" and insert therefor --comprising--; line 9, cancel "comprising" and insert therefor --of solv or diluent--; line 12, after "neutral" insert --calcium or magnesium--.

Signed and sealed this 25th day of May 1971.

(SEAL)
Attest:

EDWARD M. FLETCHER, JR.
Attesting Officer

WILLIAM E. SCHUYLER, JR.
Commissioner of Patents